(12) United States Patent
Amaro Ramirez et al.

(10) Patent No.: US 12,169,651 B2
(45) Date of Patent: Dec. 17, 2024

(54) LOW LATENCY VIRTUAL MEMORY MANAGEMENT

(71) Applicant: VMware LLC, Palo Alto, CA (US)

(72) Inventors: Emmanuel Amaro Ramirez, Oakland, CA (US); Marcos Kawazoe Aguilera, Mountain View, CA (US); Pratap Subrahmanyam, Saratoga, CA (US); Rajesh Venkatasubramanian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/371,704

(22) Filed: Jul. 9, 2021

(65) Prior Publication Data

US 2022/0334774 A1    Oct. 20, 2022

Related U.S. Application Data

(60) Provisional application No. 63/175,396, filed on Apr. 15, 2021.

(51) Int. Cl.
  *G06F 3/06*    (2006.01)
(52) U.S. Cl.
  CPC ............ *G06F 3/0662* (2013.01); *G06F 3/061* (2013.01); *G06F 3/0659* (2013.01); *G06F 3/0679* (2013.01)
(58) Field of Classification Search
  CPC ...... G06F 3/0662; G06F 3/061; G06F 3/0659; G06F 3/0679
  See application file for complete search history.

(56) References Cited

U.S. PATENT DOCUMENTS

| | | | | |
|---|---|---|---|---|
| 8,473,648 | B2 * | 6/2013 | Chakhaiyar | G06F 3/0611 710/48 |
| 8,612,633 | B2 * | 12/2013 | Cleeton | G06F 9/45558 718/1 |
| 2008/0307130 | A1 * | 12/2008 | Chang | G06F 3/0659 710/74 |
| 2011/0119679 | A1 * | 5/2011 | Muppirala | G06F 3/0611 718/105 |
| 2015/0134857 | A1 * | 5/2015 | Hahn | G06F 3/061 710/5 |
| 2015/0201018 | A1 * | 7/2015 | Abram | H04L 41/00 707/736 |
| 2017/0344266 | A1 * | 11/2017 | Basit | G06F 3/0673 |
| 2018/0024929 | A1 * | 1/2018 | Greiner | G06F 12/0862 711/137 |
| 2018/0300766 | A1 * | 10/2018 | Ashner | H04L 47/125 |
| 2019/0087129 | A1 * | 3/2019 | You | G06F 3/0659 |
| 2020/0241794 | A1 * | 7/2020 | Yeo | G06F 12/1408 |
| 2022/0398014 | A1 * | 12/2022 | Amaro Ramirez | G06F 12/1009 |

* cited by examiner

*Primary Examiner* — Zhuo H Li
(74) *Attorney, Agent, or Firm* — King Intellectual Asset Management

(57) ABSTRACT

Disclosed are various approaches for decreasing the latency involved in reading pages from swap devices. These approaches can include setting a first queue in the plurality of queues as a highest priority queue and a second queue in the plurality of queues as a low priority queue. Then, an input/output (I/O) request for an address in memory can be received. The type of the I/O request can be determined, and then the I/O request can be assigned to the first queue or the second queue of the swap device based at least in part on the type of the I/O request.

17 Claims, 3 Drawing Sheets

LOW LATENCY VIRTUAL MEMORY MANAGEMENT

CROSS-REFERENCE TO RELATED APPLICATIONS

This application claims priority to, and the benefit of, U.S. Provisional Patent Application No. 63/175,396, filed on Apr. 15, 2021 and entitled "LOW LATENCY VIRTUAL MEMORY MANAGEMENT," which is incorporated by reference as if set forth herein in its entirety.

BACKGROUND

Virtual memory systems provided by operating systems often make use of swap devices to store pages evicted from the physical memory of a computing device. Historically, swap devices were many orders of magnitude slower than physical memory in terms of both latency and throughput. However, as solid state disk (SSD) drives, network bandwidth, and Peripheral Component Interconnect Express (PCI-E) devices continue to evolve, the latency and throughput gaps between swap devices and physical memory continue to decrease. As a result, inefficiencies in the implementations of operating system virtual memory systems contribute to a proportionally larger share of the total cost of swapping.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for decreasing the latency involved in reading pages from swap devices. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
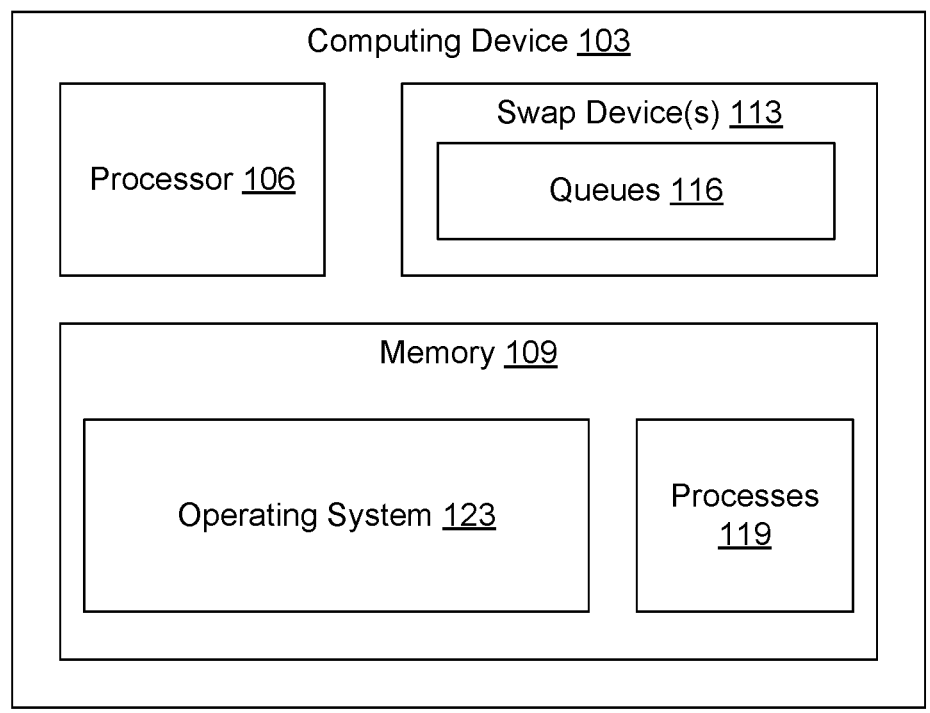
FIG. 1 is a drawing depicting several embodiments of the present disclosure.

FIG. 1 depicts a schematic block diagram of one example of a computing device 103 according to various embodiments of the present disclosure. The computing device 103 can have one or more processors 106. The computing device 103 can also have a memory 109. The computing device 103 can also have one or more swap devices 113 attached to a bus or interconnect, allowing the swap devices 113 to be in data connection with the processor 106 and/or memory 109. The swap devices 113 could contain or provide one or more queues 116 for input/output operations.

The processor 106 can represent any circuit or combination of circuits that can execute one or more machine-readable instructions stored in the memory 109 that make up a computer program or process and store the results of the execution of the machine-readable instructions in the memory 109. The processor 106 can also be configured to receive data from or send commands to one or more swap devices 113. In some implementations, the processor 106 may be configured to perform one or more machine-readable instructions in parallel or out of order. This could be done if the processor 106 includes multiple processor cores and/or additional circuitry that supports simultaneous multithreading (SMT). Examples of a processor 106 can include a central processing unit (CPU), a graphics processing unit (GPU), a field-programmable gate array (FPGA), application specific integrated circuits (ASICs), etc.

The memory 109 can include both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Various types of data and machine-readable instructions may be stored in the memory 109. For example, one or more processes 119 may be stored in the memory 109. In some implementations, an operating system 123 may also be stored in the memory 109.

A process 119 can represent a collection of machine-readable instructions stored in the memory 109 that, when executed by the processor 106 of the computing device 103, cause the computing device 103 to perform one or more tasks. A process 119 can represent a program, a sub-routine or sub-component of a program, a library used by one or more programs, etc. When a process requests access to a hardware or software resource for which it lacks permission to interact with, the process 119 can generate an interrupt and provide or send the interrupt to the operating system 123.

The operating system 123 can include any system software that manages the operation of computer hardware and software resources of the computing device 103. The operating system 123 can also provide various services or functions to computer programs, such as processes 119, that are executed by the computing device 103. Accordingly, the operating system 123 may schedule the operation of tasks or processes 119 by the processor 106, act as an intermediary between processes 119 and hardware of the computing device, such as swap devices 113. The operating system 123 may also implement and/or enforce various security safeguards and mechanisms to prevent access to hardware or software resources by unprivileged or unauthorized users or processes 119.

The operating system 123 can also implement a virtual memory system that provides an abstract representation of the memory 109 available on the computing device 103, such as the RAM. Among the features provided by the virtual memory system are a per process 119 address space, which maps virtual addresses used by a process 119 to physical addresses of the memory 109. The processor's memory management unit (MMU) can translate these virtual addresses to physical addresses, when used. The operating system 123 can use the virtual memory system to present more memory 109 to individual processes 119 than is physically available.

The swap devices 113 represent auxiliary devices or storage devices used to store the contents of memory 109 that is not currently in use. This could occur, for example, when the operating system 123 allocates memory for a second process 119, but there is no memory 109 available. In this situation, the operating system 123 could write the contents of one or more pages of memory 109 to the swap device 113 for temporary storage. When the first process needs to access the contents of the memory 109 stored on the swap device 113, the operating system 123 can load the contents of the memory 109 from the swap device 113 to memory 109 for use by the first process 119.

Accordingly, swap devices 113 can refer to any hardware component that is attached to the computing device 103 and is controlled by the computing device 103 or the operating system 123 that provides data storage capability or access to data storage. For example, local storage devices, such as solid state drives (SSDs) or hard disk drives (HDDs) could be used as swap devices 113. In these instances, a portion of the local storage device or the entirety of the local storage device could be allocated for use as a swap device 113. However, network interface cards (NICs) could also be used as swap devices 113, such as when the NICs provide a low-latency, high-bandwidth connection to a storage server or memory server. This could occur, for example, in cluster computing environments.

A swap device 113 can also include one or more queues 116, which could be used for input/output (I/O) operations. Individual queues 116 can represent queues that store I/O operations or requests that are serviced on a first-in, first-out basis. Peripheral devices in general may offer one or more queues in order to allow different processes 119 to interact with the peripheral device without impacting the I/O of other processes 119. Individual queues 116 may be serviced by the swap device 113 on a round-robin basis. Some swap devices 113 may also allow for queues 116 to have different priorities, with I/O requests in higher priority queues 116 being serviced before I/O requests in lower priority queues 116. In the event that multiple queues 116 have the same priority, the swap device 113 may also service the queues 116 with the same priority on a round-robin basis.

The operating system 123 can be configured to make use of the queues 116 of a swap device 113 to improve the latency involved in reading the contents of memory pages from a swap device 113 in response to a page fault. When the operating system 123 detects that a processor 106 accessing the contents of an address in memory 109 has caused a page fault, the operating system 123 can send a read request for the corresponding page to a swap device 113. Because accessing memory 109 on a page fault is often a latency sensitive operation, the operating system 123 can place the read request in a high priority queue 116. This causes the swap device 113 to service the read request ahead of other I/O requests stored in lower priority queues 116, such as write requests. As a result, a read request in response to a page fault can be serviced almost immediately by the swap device 113. For those swap devices 113 that do not provide hardware support for prioritizing queues 116, the operating system 123 could instead select a group or set of queues 116 to use exclusively for read requests in response to page faults. As the swap device 113 services individual queues 116 in round-robin fashion, a read request is more likely to be at the head of a reserved queue 116, and be service more quickly, than if it were at the back of a queue 116 that contained multiple I/O requests.

Figure 2:
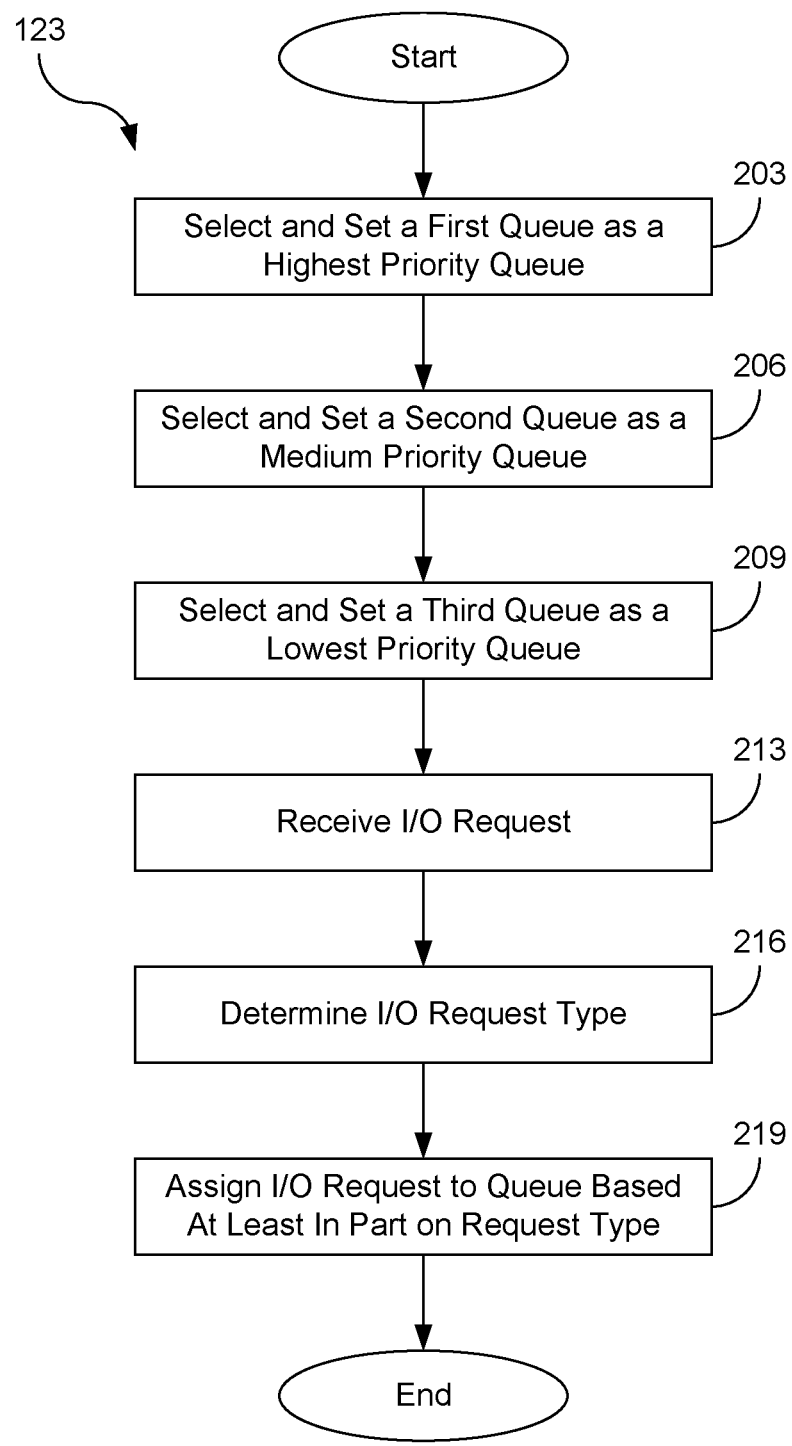
FIG. 2 is a flowchart illustrating one example of functionality implemented as portions of an operating system or hypervisor according to various embodiments of the present disclosure.

Referring next to FIG. 2, shown is a flowchart that provides one example of the operation of a portion of the operating system 123. The flowchart of FIG. 2 provides merely an example of the many different types of functional arrangements that can be employed to implement the operation of the depicted portion of the operating system 123. As an alternative, the flowchart of FIG. 2 can be viewed as depicting an example of elements of a method implemented by the computing device 103.

Beginning with block 203, the operating system 123 can select one or more queues 116 of the swap device 113 as a highest priority queue 116. Accordingly, the operating system 123 can send a command to the swap device 113 to set these queues 116 as having the highest priority. Any commands (e.g., read commands or write commands) sent to the highest priority queues 116 will be serviced ahead of queues 116 assigned a lower priority. The operating system 123 can track or record which queues 116 have been so reserved.

These highest priority queues 116 can be used for a number of purposes. For example, the highest priority queues 116 might be reserved for latency sensitive input/output (I/O) operations, such as reading a page from the swap device 113 in response to a page-fault. Although writes are not generally latency sensitive, synchronous or blocking writes generally, as well as synchronous or blocking I/O command generally, might also be assigned to the highest priority queues 116 in order to minimize delays caused by waiting on completion of the synchronous or blocking I/O.

Then at block 206, the operating system 123 can select one or more queues 116 of the swap device 113 as a lower priority queue 116 than the previously selected highest priority queues 116 (e.g., select the queues 116 as medium priority). Accordingly, the operating system 123 can send a command to the swap device 113 to set these queues 116 as having a medium or lower priority. The operating system 123 can track or record which queues 116 have been so reserved.

These medium priority queues 116 can be used for a number of purposes. For example, they might be used for I/O operations that are not as time-sensitive as those latency-sensitive operations assigned to the highest priority queues 116, but need to be serviced more quickly than I/O operations assigned to the lowest priority queues 116. Examples of I/O operations that might be assigned to a medium priority queue 116 could include read requests associated with prefetching pages that are anticipated to be read by a process 119 in the near future. Although not needed immediately, unlike a page being read from the swap device 113 in response to a page-fault, prefetched pages are anticipated to be needed in the near future. Therefore, it could be appropriate to assign read requests for prefetching pages to a medium priority queue 116. However, in those implementations which do not utilize a medium priority queues 116, I/O operations that would have been assigned to the medium priority queues 116 could be assigned to the highest or lowest priority queues 116 instead.

Similarly, at block 209, the operating system 123 can select one or more queues 116 of the swap device 113 as a lower or lowest priority queue 116. Accordingly, the operating system 123 can send a command to the swap device 113 to set these queues 116 as having a lower or the lowest priority. The operating system 123 can track or record which queues 116 have been so reserved.

The lowest priority queues 116 can be used for those I/O operations which are impacted the least by delays in execution. For example, many times a write request is latency insensitive. Once the write request is issued, how long it takes for the write request to complete can vary greatly without impacting the performance of a process 119 issuing the write request or the computing device 103 itself. Accordingly, writes to the swap device 113 could be placed in those queues 116 that are the lowest priority queues 116.

Subsequently, at block 213, the operating system 123 can receive an I/O request. The I/O request could represent a request from the virtual memory system of the operating system 123. For example, the I/O request could represent a page fault resulting from an attempt to access the contents of memory 109 at a particular address, requiring that page previously stored to the swap device 113 be read and copied back to memory 109. Alternatively, the I/O request could represent an eviction of a page of the memory 109, which would require the contents of the page to be written to the swap device 113.

Accordingly, at block 216, the operating system 123 can determine the type of I/O request that was received at block 213. This could be done by evaluating a message, flag, or other indicia provided by the virtual memory system. For example, the virtual memory system could provide the operating system 123 with a flag that indicates that the I/O request is a read related to a page fault, a read intended to prefetch a page in anticipation of a future access (e.g., due to spatial or temporal locality), that the I/O request is related to writing one or more pages of memory 109 to the swap device 113, etc.

Therefore, at block 219, the operating system 123 can assign the I/O request to an appropriate queue 116. For example, if the I/O request were a read request related to a page fault, the I/O request could be assigned by the operating system 123 to the highest priority queue 116 previously configured at block 203. As another example, if the I/O request were a read request related to prefetching a page in anticipation of a future access (e.g., due to spatial or temporal locality), then the I/O request could be assigned by the operating system 123 to the medium priority queue 116 previously configured at block 206. In a third example, if the I/O request were a write request related to the eviction of a page in the memory 109, the I/O request could be assigned by the operating system 123 to the lowest priority queue 116 previously configured at block 209.

Figure 3:
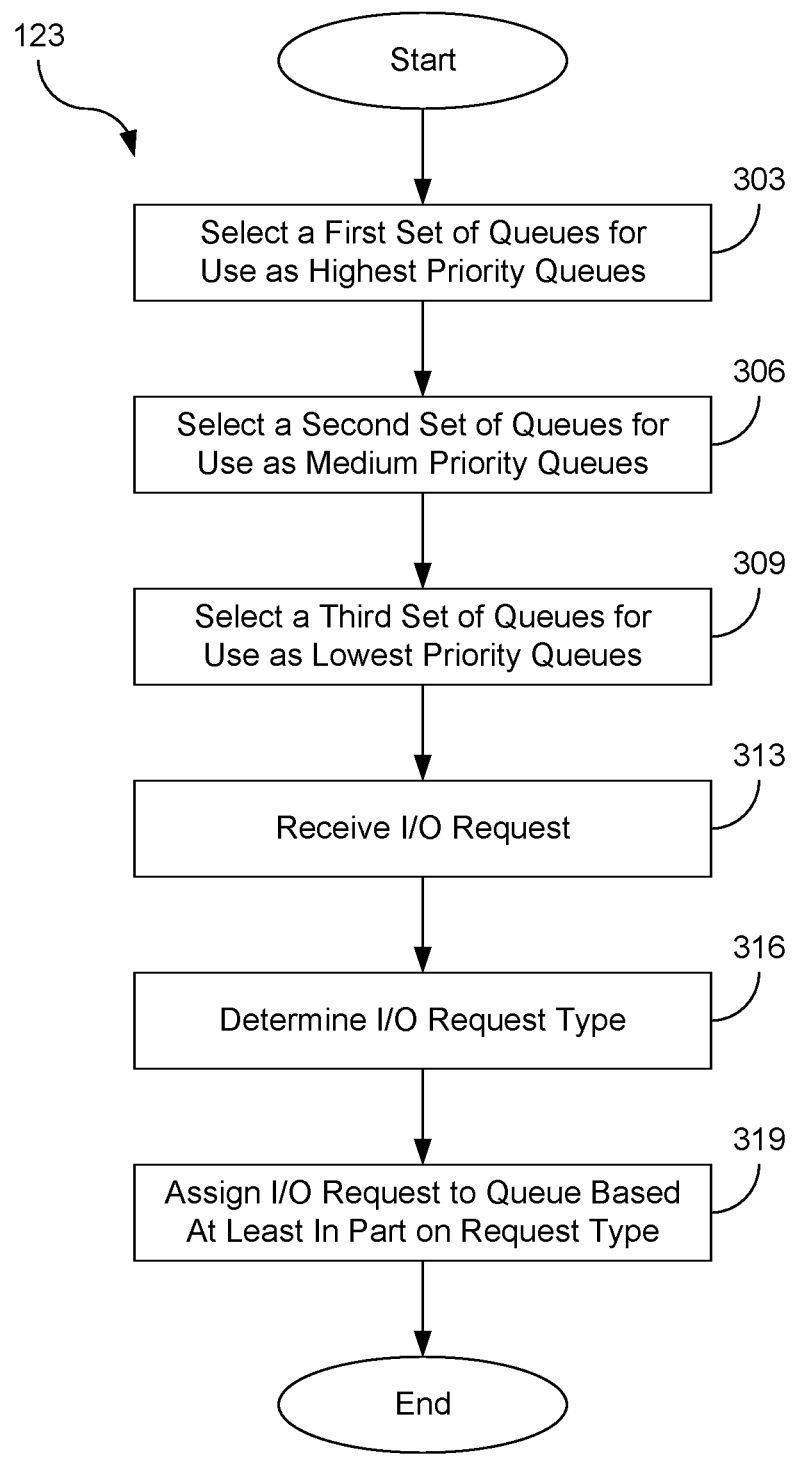
FIG. 3 is a flowchart illustrating one example of functionality implemented as portions of an operating system or hypervisor according to various embodiments of the present disclosure.

Referring next to FIG. 3, shown is a flowchart that provides one example of the operation of a portion of the operating system 123. The flowchart of FIG. 3 provides merely an example of the many different types of functional arrangements that can be employed to implement the operation of the depicted portion of the operating system 123. As an alternative, the flowchart of FIG. 3 can be viewed as depicting an example of elements of a method implemented by the computing device 103. In contrast to the flowchart of FIG. 2, the flowchart of FIG. 3 discusses an alternative implementation for when swap device 113 does not provide prioritization of individual queues 116.

Beginning with block 303, the operating system 123 can select one or more queues 116 of the swap device 113 to serve as a highest priority queue 116. In order to improve the latency of read operations, the operating system 123 may select a larger number of queues 116 at block 303 than it would at subsequent blocks 306 and/or 309. By reserving a larger number of queues 116 to serve as highest priority queues 116, the operating system 123 can increase the likelihood that I/O requests assigned to these queues will both be at the front of the queue 116 and that the I/O requests will be serviced sooner relative to other queues 116. As individual queues 116 are serviced in round-robin fashion, the swap device 113 will spend a larger proportion of its time servicing queues 116 that store the highest priority I/O requests relative to the fewer number of queues 116 that service the lower priority I/O requests. The operating system 123 can track or record which queues 116 have been so reserved.

Alternatively, rather than reserving a larger number of queues 116 to serve as highest priority queues 116, the operating system 123 can reserve a similar number of queues 116 to serve as highest priority queues 116 but limit the use of the highest priority queues 116 to a small and selected number of I/O requests. By limiting the use of the highest priority queues 116, the operating system 123 can increase the likelihood that I/O requests assigned to these queues will be at the front of the queues 116 and that the I/O requests will be serviced sooner relative to most of the other larger number of requests in other queues 116.

These highest priority queues 116 can be used for a number of purposes. For example, the highest priority queues 116 might be reserved for latency sensitive input/output (I/O) operations, such as reading a page from the swap device 113 in response to a page-fault. Although writes are not generally latency sensitive, synchronous or blocking writes generally, as well as synchronous or blocking I/O command generally, might also be assigned to the highest priority queues 116 in order to minimize delays caused by waiting on completion of the synchronous or blocking I/O.

Then at block 306, the operating system 123 can select one or more queues 116 of the swap device 113 as a lower priority queue 116 than the previously selected highest priority queues 116 (e.g., select the queues 116 as medium priority). The number of queues 116 selected at block 306 may be less than the number of queues 116 selected at block 303. The operating system 123 can track or record which queues 116 have been so reserved.

These medium priority queues 116 can be used for a number of purposes. For example, they might be used for I/O operations that are not as time-sensitive as those latency-sensitive operations assigned to the highest priority queues 116, but need to be serviced more quickly than I/O operations assigned to the lowest priority queues 116. Examples of I/O operations that might be assigned to a medium priority queue 116 could include read requests associated with prefetching pages that are anticipated to be read by a process 119 in the near future. Although not needed immediately, unlike a page being read from the swap device 113 in response to a page-fault, prefetched pages are anticipated to be needed in the near future. Therefore, it could be appropriate to assign read requests for prefetching pages to a medium priority queue 116. However, in those implementations which do not utilize a medium priority queues 116, I/O operations that would have been assigned to the medium priority queues 116 could be assigned to the highest or lowest priority queues 116 instead.

Similarly, at block 309, the operating system 123 can select one or more queues 116 of the swap device 113 as a lower or lowest priority queue 116. The number of queues 116 selected at block 306 may be less than the number of queues 116 selected at block 303 or 306. The operating system 123 can track or record which queues 116 have been so reserved.

The lowest priority queues 116 can be used for those I/O operations which are impacted the least by delays in execution. For example, many times a write request is latency insensitive. Once the write request is issued, how long it takes for the write request to complete can vary greatly without impacting the performance of a process 119 issuing the write request or the computing device 103 itself. Accordingly, writes to the swap device 113 could be placed in those queues 116 that are the lowest priority queues 116.

Subsequently, at block 313, the operating system 123 can receive an I/O request. The I/O request could represent a request from the virtual memory system of the operating system 123. For example, the I/O request could represent a page fault resulting from an attempt to access the contents of memory 109 at a particular address, requiring that page previously stored to the swap device 113 be read and copied back to memory 109. In a similar example, the I/O request could represent a read request for a page stored by the swap device 113 in order to prefetch the page for later use by a process 119. As another example, the I/O request could represent an eviction of a page of the memory 109, which would require the contents of the page to be written to the swap device 113.

Accordingly, at block 316, the operating system 123 can determine the type of I/O request that was received at block 313. This could be done by evaluating a message, flag, or other indicia provided by the virtual memory system. For example, the virtual memory system could provide the operating system 123 with a flag that indicates that the I/O request is a read related to page fault, a read intended to prefetch a page in anticipation of a future access (e.g., due to spatial or temporal locality), or that the I/O request is related to writing one or more pages of memory 109 to the swap device 113.

Therefore, at block 319, the operating system 123 can assign the I/O request to an appropriate queue 116. For example, if the I/O request were a read request related to a page fault, the I/O request could be assigned by the operating system 123 to a highest priority queue 116 previously configured at block 303. As another example, if the I/O request were a read request related to prefetching a page in anticipation of a future read (e.g., due to spatial or temporal locality), then the I/O request could be assigned by the operating system 123 to a medium priority queue 116 previously configured at block 306. In another example, if the I/O request were a write request related to the eviction of a page in the memory 109, the I/O request could be assigned by the operating system 123 to a lowest priority queue 116 previously configured at block 309.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), persistent memory, hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, graphics processing units (GPUs), field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor, a memory, and a swap device comprising a plurality of queues, wherein the swap device is at least one of a hard disk drive, a solid state drive, or a network interface card, the swap device configured to store one or more pages of memory from the memory, wherein each queue of the plurality of queues is configured to store input/output (I/O) requests, wherein I/O requests are requests to access a respective memory address in the one or more pages of memory stored by the swap device, and wherein the plurality of queues is configured to be serviced by the swap device; and
machine-readable instructions stored in the memory that, when executed by the processor, cause the computing device to at least:
set a first queue in the plurality of queues on the swap device as a highest priority queue;
set a second queue in the plurality of queues on the swap device as a low priority queue;
receive an I/O request to access an address of a memory page stored on the swap device;
determine a type of the I/O request by evaluating a message provided by a virtual memory system; and
assign the I/O request to the first queue or the second queue of the swap device based at least in part on the type of the I/O request.

2. The system of claim 1, wherein:
the I/O request is a request to prefetch a page stored on the swap device;
the machine-readable instructions further cause the computing device to at least set a third queue in the plurality of queues as a medium priority queue; and
the machine-readable instructions that cause the computing device to assign the I/O request further cause the computing device to assign the I/O request to the second queue.

3. The system of claim 2, wherein the I/O request is a request to write the contents of a page in memory to the swap device and the machine-readable instructions that cause the computing device to assign the I/O request further cause the computing device to assign the I/O request to the third queue.

4. The system of claim 1, wherein the swap device is the network interface card and the network interface card transmits the I/O request to a storage server or memory server in data communication with the computing device.

5. The system of claim 1, wherein the swap device processes, in response to the computing device assigning the I/O request to the first queue or the second queue of the swap device, the I/O request.

6. The system of claim 5, wherein the swap device processes queues in the plurality of queues in a round-robin fashion prioritizing the first queue.

7. A method, comprising:
setting a first queue in a plurality of queues provided by a swap device as a highest priority queue, wherein the swap device is at least one of a hard disk drive, a solid state drive, or a network interface card, the swap device configured to store one or more pages of memory from physical memory, wherein the swap device is one of a hard disk drive, solid state drive, or network interface card, wherein each queue of the plurality of queues is configured to store input/output (I/O) requests, wherein I/O requests are requests to access a respective memory address in the one or more pages of memory stored by the swap device, and wherein the plurality of queues is configured to be serviced by the swap device;
setting a second queue in the plurality of queues provided by the swap device as a medium priority queue;
setting a third queue in the plurality of queues provided by the swap device as a low priority queue;
receiving an I/O request to access an address of a memory page stored on the swap device;
determining a type of the I/O request by evaluating a message provided by a virtual memory system; and
assigning the I/O request to the first queue, the second queue, or the third queue of the swap device based at least in part on the type of the I/O request.

8. The method of claim 7, wherein the I/O request is a request to prefetch a page stored on the swap device and assigning the I/O request further comprises assigning the I/O request to the second queue.

9. The method of claim 7, wherein the I/O request is a request to write the contents of a page in memory to the swap device and assigning the I/O request further comprises assigning the I/O request to the third queue.

10. The method of claim 7, wherein the swap device is the network interface card and the network interface card transmits the I/O request to a storage server or memory server.

11. The method of claim 7, wherein the swap device processes, in response to the computing device assigning the I/O request to the first queue, the second queue, or the third queue of the swap device, the I/O request.

12. The method of claim 11, wherein the swap device processes queues in the plurality of queues in a round-robin fashion prioritizing the first queue.

13. A non-transitory, computer-readable medium, comprising machine-readable instructions that, when executed by a processor of a computing device, cause the computing device to at least:

set a first queue in a plurality of queues as a highest priority queue, the plurality of queues being provided by a swap device of the computing device, wherein the swap device is at least one of a hard disk drive, a solid state drive, or a network interface card, the swap device configured to store one or more pages of memory from physical memory, wherein each queue of the plurality of queues is configured to store input/output (I/O) requests, wherein I/O requests are requests to access a respective memory address in the one or more pages of memory stored by the swap device, and wherein the plurality of queues is configured to be serviced by the swap device;
set a second queue in the plurality of queues provided by the swap device as a medium priority queue;
set a third queue in the plurality of queues provided by the swap device as a low priority queue;
receive an I/O request to access an address of a memory page stored on the swap device;
determine a type of the I/O request by evaluating a message provided by a virtual memory system; and
assign the I/O request to the first queue, the second queue, or the third queue of the swap device based at least in part on the type of the I/O request.

14. The non-transitory, computer-readable medium of claim 13, wherein the I/O request is a request to prefetch a page stored on the swap device and the machine-readable instructions that cause the computing device to assign the I/O request further cause the computing device to assign the I/O request to the second queue.

15. The non-transitory, computer-readable medium of claim 13, wherein the I/O request is a request to write the contents of a page the memory to the swap device and the machine-readable instructions that cause the computing device to assign the I/O request further cause the computing device to assign the I/O request to the third queue.

16. The non-transitory, computer-readable medium of claim 13, wherein the swap device processes, in response to the computing device assigning the I/O request to the first queue, the second queue, or the third queue of the swap device, the I/O request.

17. The non-transitory, computer-readable medium of claim 16, wherein the swap device processes queues in the plurality of queues in a round-robin fashion prioritizing the first queue.

* * * * *